United States Patent [19]

Ito et al.

[11] 4,420,812
[45] Dec. 13, 1983

[54] TEACHING- PLAYBACK ROBOT

[75] Inventors: Yoshimasa Ito; Junji Hashizume, both of Yokohama; Junichi Ikeda, Tokyo; Noriyuki Utsumi; Tessyu Naka, both of Yokohama, all of Japan

[73] Assignee: Tokico, Ltd., Kawasaki, Japan

[21] Appl. No.: 185,023

[22] Filed: Sep. 8, 1980

[30] Foreign Application Priority Data

Sep. 14, 1979 [JP] Japan ................................. 54-118510
Oct. 19, 1979 [JP] Japan ................................. 54-135006

[51] Int. Cl.³ ........................ G05B 19/42; G06F 15/46
[52] U.S. Cl. ..................................... 364/513; 318/573; 364/577
[58] Field of Search ............... 364/169, 171, 188, 193, 364/513; 318/568, 573; 414/1, 4, 730–739

[56] References Cited

U.S. PATENT DOCUMENTS

| | | | |
|---|---|---|---|
| Re. 30,132 | 10/1979 | Irie ..................................... | 318/568 |
| 3,909,600 | 9/1975 | Hohn .................................. | 364/513 |
| 4,086,522 | 4/1978 | Engelberger et al. ............... | 318/568 |
| 4,163,183 | 7/1979 | Engelberger et al. ............... | 318/568 |
| 4,178,632 | 12/1979 | Anthony .......................... | 318/568 X |
| 4,187,454 | 2/1980 | Ito et al. ............................. | 318/568 |
| 4,224,501 | 9/1980 | Lindbom et al. ............... | 318/568 X |
| 4,239,431 | 12/1980 | Davini .................................... | 414/1 |
| 4,260,940 | 4/1981 | Engelberger et al. .......... | 318/568 X |
| 4,263,538 | 4/1981 | Richiardi ........................ | 364/513 X |

FOREIGN PATENT DOCUMENTS

| | | | |
|---|---|---|---|
| 1491586 | 11/1977 | United Kingdom ................ | 364/513 |
| 1561661 | 2/1980 | United Kingdom ................ | 364/513 |
| 2027938 | 2/1980 | United Kingdom ................ | 364/193 |

*Primary Examiner*—Felix D. Gruber
*Attorney, Agent, or Firm*—Wegner & Bretschneider

[57] ABSTRACT

A teaching-playback type robot is disclosed having a manipulator with a plurality of movable members connected to each other, a detector detecting the relative positions of the members, a switch for designating position signals from the detector upon a teaching operation, a memory for storing position signals from the detector, an interpolating arithmetic circuit for performing interpolating operation based on two position signals read out from memory upon playback operation.

24 Claims, 9 Drawing Figures

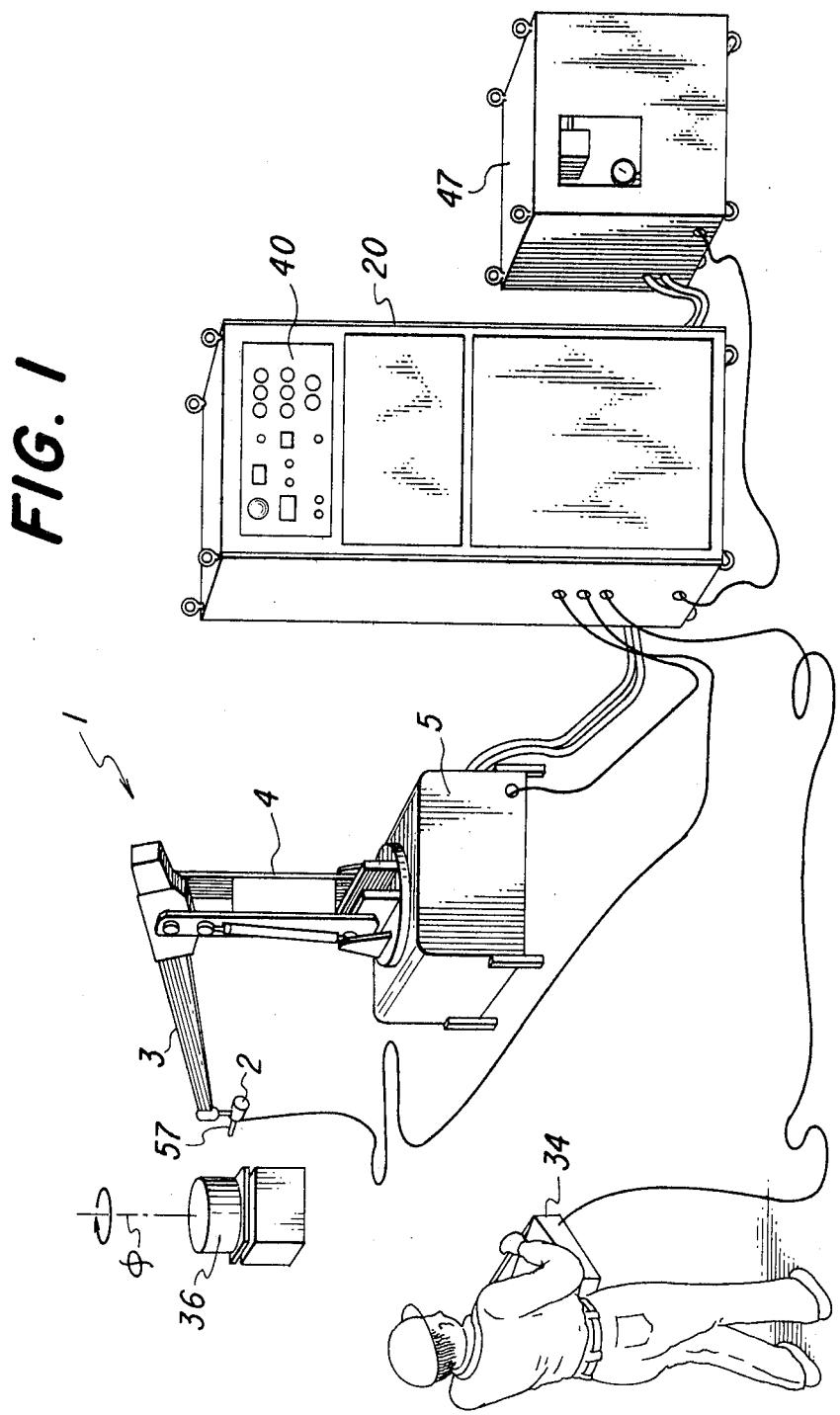

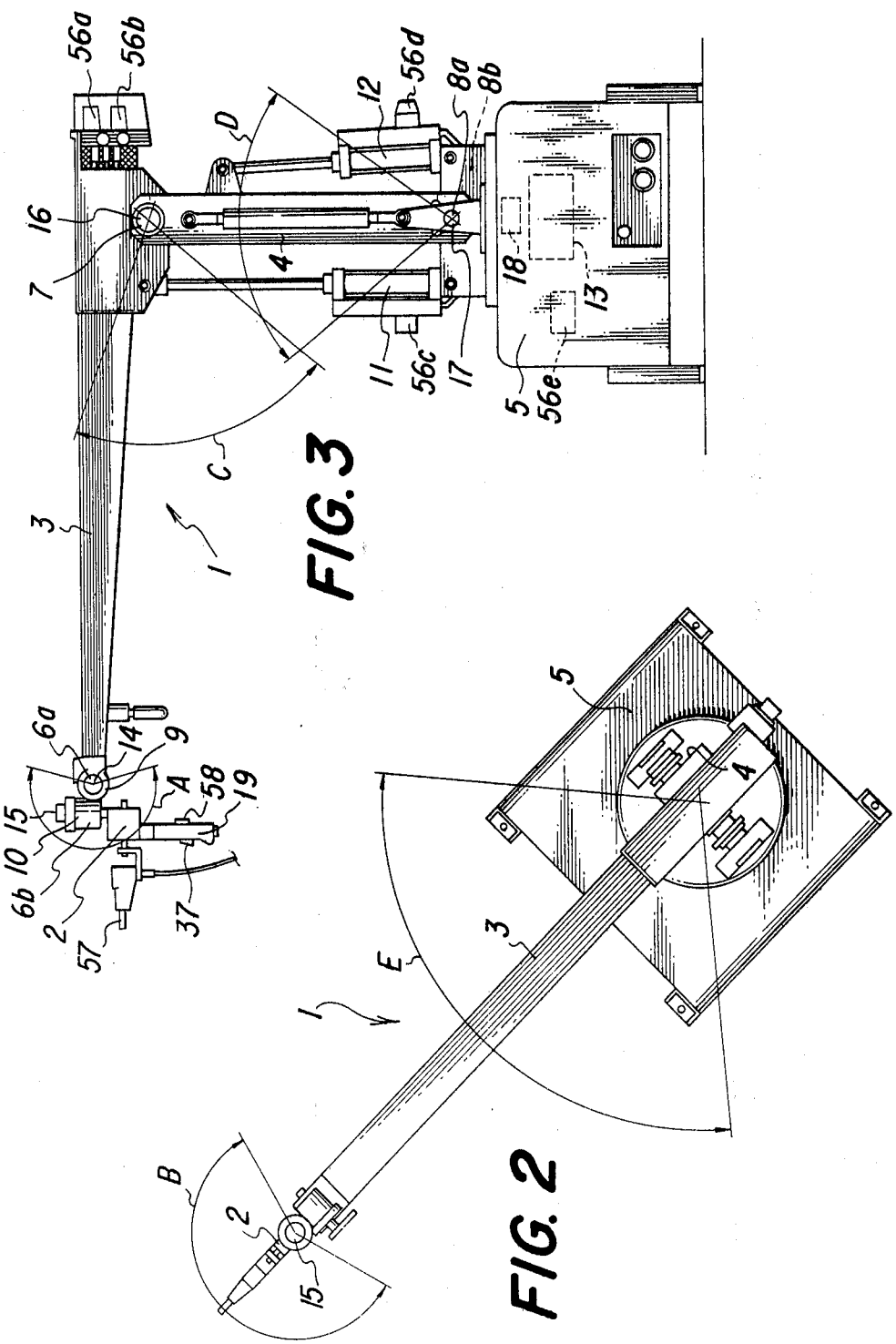

TEACHING-PLAYBACK ROBOT

BACKGROUND OF THE INVENTION

This invention relates to a robot, and more particularly, to a so-called teaching-playback type robot.

Teaching-playback type robots have been known, for example, for painting use, in which the top end of a robot manipulator having a spray nozzle is moved by an operator to conduct simulated painting work on to an object to be painted with simultaneous storing of the contents of the work in a memory device (generally referred to as teaching operation) and, after the storing of all of the contents of the work, the contents of the work thus stored are then read out and the actual painting work is conducted automatically following the read out of the contents of the work (generally referred to as playback operation).

In the conventional robot of such a type, however, the capacity of the memory unit has to be extremely large for successively storing the contents of the work in the memory device in the teaching operation thus increasing the cost and, in addition, operator's manipulating speed in the teaching operation has to be coincided with actual painting speed, requiring highly skilled techniques for the teaching operation. Further, correction even for a part of the programmed contents of the works has been conducted by repeating the teaching operation again and storing all of the contents of the work including partially corrected contents again to the memory device. In view of the above, conventional teaching-playback type robots have certain definite drawbacks.

On the other hand, it may be desired for the robot to conduct painting work on objects which are conveyed successively, but complicated structures are generally required for performing teaching and playback operations to such moving objects and no satisfactory techniques have been proposed yet.

SUMMARY OF THE INVENTION

An object of this invention is to provide a robot with the memory device of small capacity which can be, manipulated with ease even by unskilled operators and can perform partial correction easily.

Another object of this invention is to provide a robot capable of carrying out work on objects which are conveyed successively.

This invention provides a robot comprising a manipulator having a plurality of movable members connected to each other with joints, detection means for detecting the relative positions of the movable members to each other at each of the joints, means for designating positional signals from the detection means upon teaching operation, memory means for successively storing supplied positional signals, interpolating operation means for executing interpolating operation based on two positional signals read out in order to determine a required number of positions between the positions corresponding to two positional signals read out from the memory means upon playback, and servo means for positioning each of the movable members of the manipulator referring to the operation result signals from the interpolating operation means as command values and based on the positional signals from the detection means as present values.

According to the robot of this invention, since dimerse positions are stored as positional signals upon teaching operation, the capacity of the memory is not required to be so large and, in addition, since positioning is conducted by the interpolated positions determined from the positional signals obtained in a dispersing manner, the playback operation can be performed smoothly. Moreover, since the number of divisions, that is, the number of interpolations can optionally be set, fine control can be conducted, as required. Furthermore since the positional correction can be conducted with ease by a corrector, as required, the working efficiency can be increased to significantly improve the productivity.

BRIEF DESCRIPTION OF THE DRAWINGS

This invention is to be described by way of preferred embodiments referring to the drawings by which the foregoing and other objects, as well as features of this invention will become more apparent.

FIG. 1 is an explanatory view of a preferred embodiment of this invention;

FIG. 2 is a plan view of the manipulator shown in FIG. 1;

FIG. 3 is a side view of the manipulator shown in FIG. 1;

DETAILED DESCRIPTION OF THE INVENTION

Figure 3A:
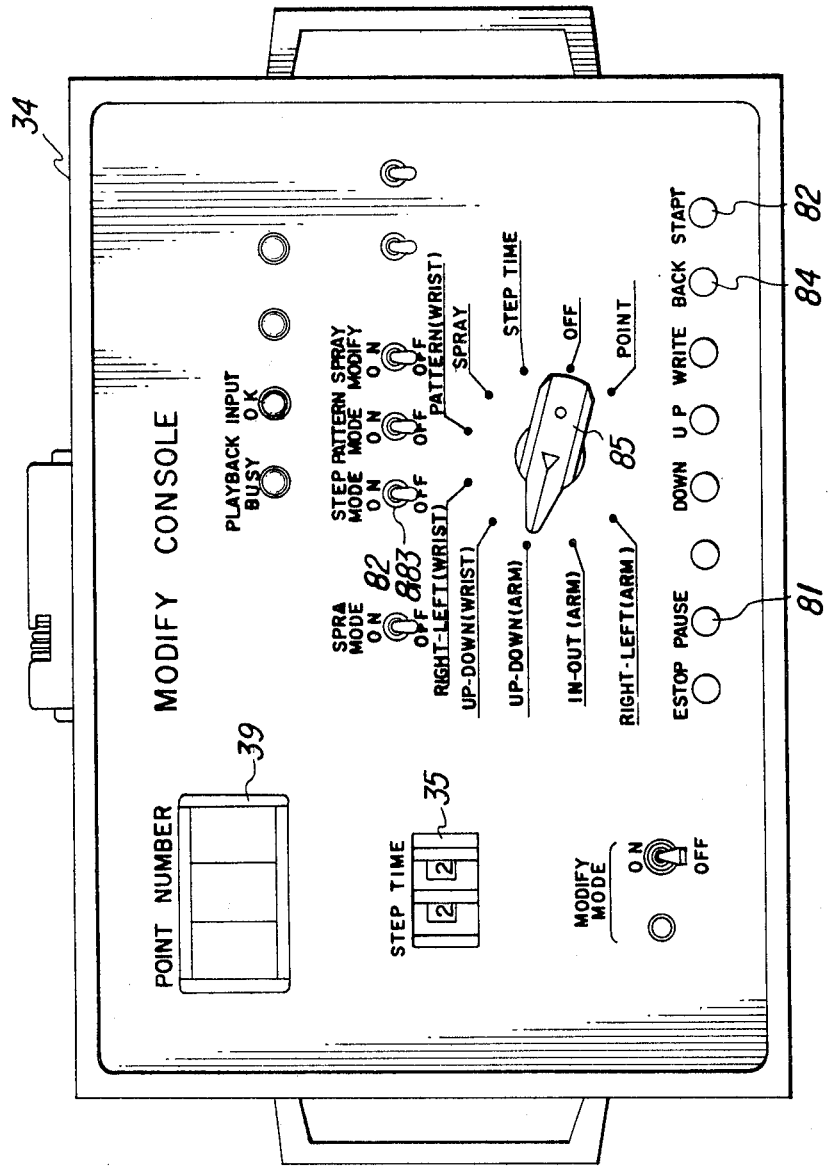
FIG. 3a is a plan view of the modify console shown in FIG. 1.

In FIG. 1 to FIG. 5, a robot manipulator 1 comprises a wrist 2, an arm 3 and a support post 4 as movable members and a stationary bed 5. The wrist 2 and the arm 3 are connected with joints 6a and 6b in which the wrist 2 is made rotatable to the arm 3 in a vertical plane within an angle A, as well as in the plane in perpendicular to the vertical plane within an angle B. The arm 3 and the support post 4 are connected with a joint 7 and the support arm 4 and the stationary bed 5 are connected with joints 8a and 8b in which the arm 3 is made rotatable to the support post 4 in a vertical plane within an angle C, and the support post 4 is made rotatable to the stationary bed 5 in a vertical plane within an angle D and also in the plane in perpendicular to the vertical plane within an angle E.

The arm 3 has hydraulic actuators 9 and 10 for rotating the wrist 2 to the arm 3 within the ranges of the angle A and the angle B, the arm 3 and the support post 4 have therebetween a hydraulic actuator 11 for rotating the arm 3 to the support post 4 within the range of the angle C and the support post 4 and the stationary bed 5 have hydraulic actuators 12 and 13 respectively for rotating the support post 4 to the stationary bed 5 within the ranges of the angle D and the angle E respectively.

The joints 6a and 6b have potentiometers 14 and 15 as positional detectors for the detection of the rotating angle of the wrist 2 to the arm 3 within the ranges of the angle A and the angle B, the joint 7 has a potentiometer 16 as a positional detector for the detection of the rotating angle of the arm 3 to the support post 4 within the range of the angle C and the joints 8a and 8b have potentiometers 17 and 18 respectively as positional detectors for the detection of the rotating angle of the support post 4 to the stationary bed 5 within the ranges of the angle D and the angle E. The wrist 2 is detachably provided with a handle 19, which is attached to the wrist 2 in the teaching operation and detached therefrom, as required, in the playback operation.

Figure 4:
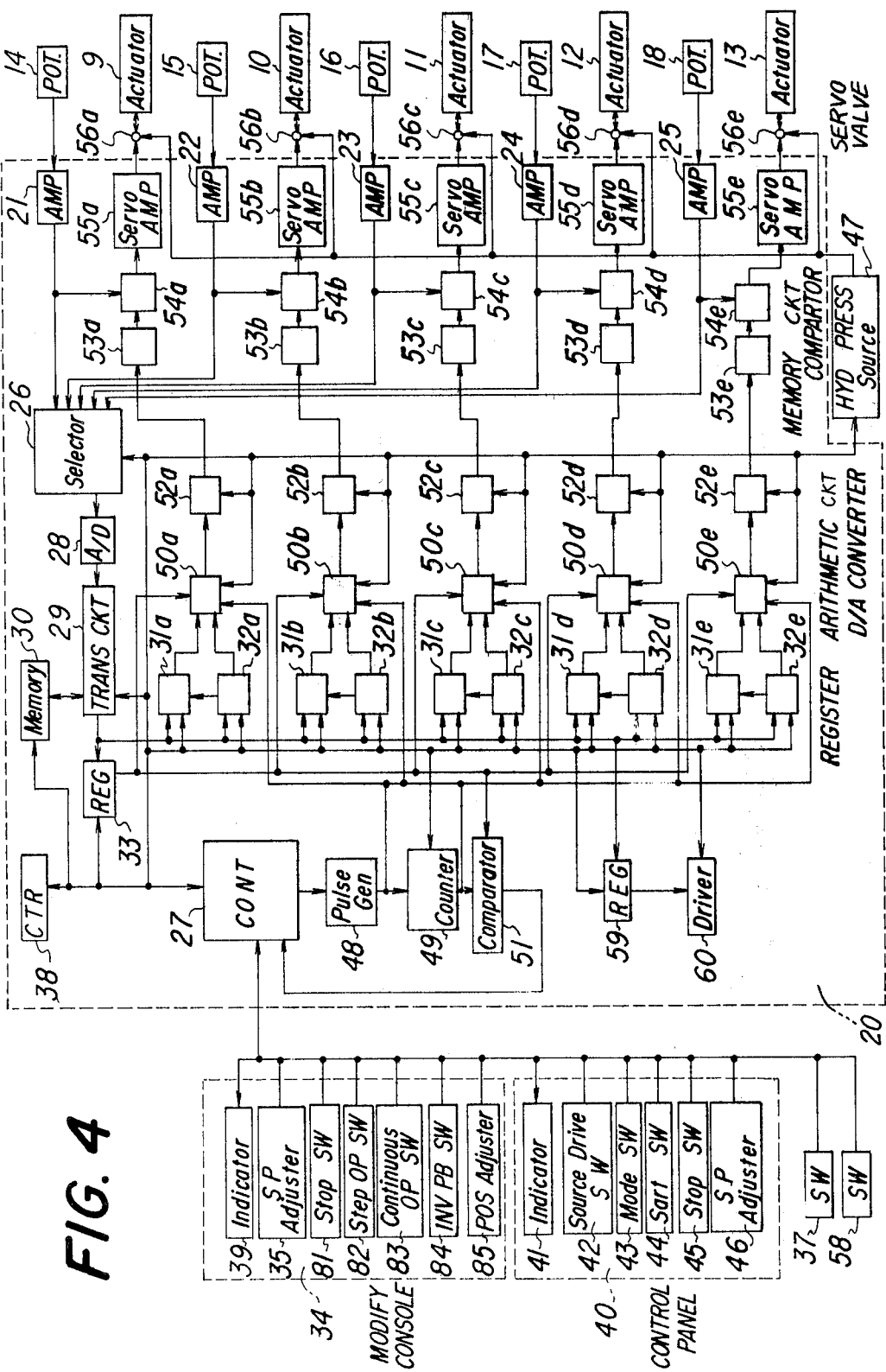
FIG. 4 is a diagram of electronic and hydraulic systems of the embodiment shown in FIG. 1.
Figure 5:
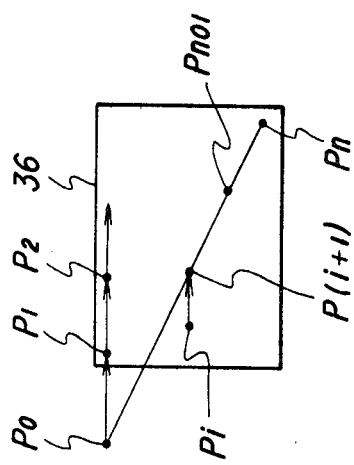
FIG. 5 is an explanatory view of the teaching and playback operations in the embodiment shown in FIG. 1.

As shown in FIG. 4 each of electrical angular signals from the potentiometers 14–18 is supplied to respective input circuits or amplifier 21–25 provided in a control unit 20, and each of the angular signals from the potentiometers 14–18 is amplified to a pedetermined level in the input circuits 21–25. Each of the angular signals inputted from the potentiometers 14–18 to the input circuits 21–25 is supplied to a selection circuit 26. The selection circuit 26, during teaching operation, selects in a predetermined order, the angular signals from each of the input circuits by an electrical control signal from a controller 27 and supplies the selected angular signals to analog to digital converter (A/D converter) 28. The A/D converter 28 converts the angular signals in the form of electrical analog signals into electrical digital signals and supplies the converted digital electrical signals to a circuit 29 for control of signal transfer. The circuit 29 for control of signal transfer supplies, upon teaching operation, the angular signals from the A/D converter 28 to a memory unit 30 in response to control signals from the controller 27 and supplies, upon playback operation, angular signals, speed signal and spray start or stop signal read out from the memory unit 30 as described later to registers 32a–32e, 33 and 59 by control signals from the control circuit 27. The memory unit 30 stores therein angular signals supplied from the A/D converter 28 by way of the circuit 29 for control of signal transfer, speed signal supplied from a speed setter or adjuster 35 provided in a corrector or modify console 34 and paint spray start or stop signal from a switch 58 provided to the handle 19 successively of each of the teaching positions Pi (as seen in FIG. 5), controlled by address signal supplied from the control circuit 27 in the teaching operation.

A switch 37 is provided to the handle 19 for designating the teaching position Pi to the object 36 upon teaching operation, and an electrical actuation signal from the switch 37 is supplied to the control circuit 27 which, in turn, supplies control signals to the selection circuit 26 and to the memory unit 30 under the control of the electrical actuation signal from the switch 37. During teaching, the number of actuations for the switch 37 is counted in a counter 38. The counted value in the counter 38 is supplied to the digital display or indicator 39 in the console 34 and to the digital display or indicator 41 provided on a control panel 40 of the control unit 20, and these indicators 39 and 41 display, in decimal indication, the counted value in the counter 38 respectively. Upon playback operation the counter 38 advances the counted value each by one on the arrival of electrical pulses generated from the control circuit 27 on every reading out of the angular signals, the speed signal, and the spray start or stop signal relative to the teaching position Pi. Specifically, for playback, the counter 38 counts the number of readings for the data block commprising the angular signals corresponding, in number, to the number of the potentiometers 14–18, one speed signal and the spray start or stop signal.

The panel 40 has, provided thereon, a hydraulic source actuation switch 42, a teaching/playback mode change switch 43, a start switch 44, a stop switch 45 and a second speed setter or adjuster 46 consisting of a variable resistor. The switch 42 specifies, by its ON-OFF electric signals, the operation of the hydraulic source 47 in such a manner that the pump of the hydraulic source 47 is started by the control circuit 27 when the switch 42 is turned ON and, while on the other hand, the pump of the hydraulic source 47 is stopped by the control circuit 27 when the switch 42 is turned OFF. The ON or OFF electrical signal from the switch 43 is supplied to the control circuit 27. The control circuit 27 is set to a teaching mode or a playback mode depending on the ON or OFF signal from the switch 43, in which the control circuit 27 generates a conrol signal necessary for the teaching operation when it is set to the teaching mode and generates a control signal required for the playback operation when it is set to the playback mode. The electrical signal from the speed setter 46 is supplied by way of the control circuit 27 to a pulse generator 48. The pulse generator 48 generates a series of electrical pulses with a certain pulse period under the control of the control circuit 27 upon playback operation. The period is set to a predetermined value by the setting signal supplied from the speed setter 46. The period of the pulse generator 48 can optionally be adjusted between 5 msec–20 msec by the speed setter 46.

The pulses generator from the pulse generator 48 are supplied to a counter 49 and digital interpolation circuits or arithmetic circuits 50a–50e, by which the counter 49 counts the pulses supplied from the pulse generator 48 and supplies the counted value to the digital interpolation circuits 50a–50e and to the comparison circuit 51, and the digital interpolation circuits 50a–50e execute the interpolating operation for the signals supplied from the registers 31a–31e, 32a–32e and 33, the pulse generator 48 and the counter 49 under the control of the control circuit 27. The comparison circuit 51 regularly compares the speed signal stored in the register 33 with the counted value in the counter 49 and issues a zero detection signal to the control circuit 27 when there is no difference in the comparison.

In the case of the playback operation, angular signals are stored in the registers 31a–31e and 32a–32e, and the speed signal is stored in the register 33. Each of the digital interpolation circuits 50a–50e functions to conduct linear interpolation between the teaching positions $P_i$ and $P_{(i+1)}$ (shown in FIG. 5) and determines the value based on each of the values Xai~Xei for the angular signals at the $i_{th}$ teaching position $P_i$ from each of the registers 31a–31e, each of the values Xa(i+1)~Xe(i+1) for the angular signals at the $(i+1)_{th}$ teaching position $P_{(i+1)}$ from each of the registers 32a~32e, the value Ni for the $i_{th}$ speed signal from the register 33 and the counted value Cn from the counter 49. That is, the operation circuit, for example, the circuit 50a performs the operation;

$$Xar = Xai + \frac{[Xa(i+1) - Xai]}{Ni} \cdot Cn$$

for determining the value Xar of the interpolation position relative to the range of the angle A between the positions $P_i$ and $P_{(i+1)}$ on every generation of the pulses from the pulse generator 48, based on the value Xai for the angular signal from the register 31a, the value Xa(i+1) for the angular signal from the register 32a, the value Ni for the speed signal from the register 33 and the counted value Cn from the counter 49. Other digital interpolation circuits 50b-50e perform the operations in the same manner and each of the digital interpolation circuits 50a-50e issues operation result signals to each of digital to analog converters (D/A converter) 52a-52e. The interpolating operation is performed in a known binary digital operation.

Each of the D/A converters 52a-52e converts the operation result signals supplied as digital electrical signals into analog electrical signals and supplies the analog signals to each of analog memories 53a-53e to hold the signals till the generation of the succeeding operation result signals. Instead of the analog memories 53a-53e, registers for storing the operation result signals as digital signals and holding the signals till the generation of the succeeding operation result signals may be provided between each of the operation circuits 50a-50e and each of the D/A converters 52a-52e. The operation result signals supplied to the analog memories 53a-53e are supplied to comparators 54a-54e in a servo circuit respectively as command values.

Each of the comparators 54a-54e compares the angular signals, as the present value, supplied from the potentiometers 14-18 by way of the input circuits 21-25 with the angular signals, as the command value, supplied from the memories 53a-53e upon playback, and supplies a difference signal as the result of the comparison to each of servo amplifiers 55a-55e. Each of the servo amplifiers 55a-55e appropriately amplifies the supplied electrical difference signal and supplies the thus amplified difference signal to each of servo valves 56a-56e. The servo valves 56a-56e control the charge and discharge of the hydraulic pressure in the hydraulic source 47 to the hydraulic actuators 9-13 based on the difference signal thus supplied. In this manner, for the positional control of the wrist 2 within the angle A, for example, the pontentiometer 14, the input circuit 21, the comparator 54a, the servo amplifier 55a, the servo valve 56a and the actuator 9 constitute a servo circuit, that is, a feedback loop, by which the position of the wrist 2 as the movable member is set to the command values successively inputted to the comparator 54a. Servo circuits are formed in the same manner for the positional control of other movable members.

In the application use for painting work, a paint spray nozzle 57 is attached to the wrist 2 and a switch 58 indicating the start or stop for the paint spray from the nozzle 57 is provided to the handle 19. The paint spray start or stop signal generated from the switch 58 upon teaching is stored by way of the control circuit 27 into the memory unit 30. While on the other hand, the spray start or stop signal stored in the memory unit 30 is read out upon playback to a register 59 for use as a control signal to a paint spray actuator 60.

The operation of the robot having the foregoing constitution is now explained. In the case of the teaching mode, the switch 42 is set to OFF state and the actuation of the pump in the hydrualic source 47 is thereby stopped. In the state where the actuation of the pump in the hydraulic source 47 is stopped and hence the generation of the hydraulic pressure from the hydraulic source 47 is interrupted, each of the movable members is made freely rotatable.

Then, the switch 43 is pushed to output an ON signal to the control circuit 27 so as to operate the circuit 27 in the teaching mode. After the setting of the teaching mode and by the actuation to the start switch 44, the control circuit 27 supplies a reset pulse to the counter 38 in order to display "0" on the displays 39 and 41. Then, the handle 19 is manipulated to the object 36 to move the nozzle 57 to the initial position $P_O$ and, thereafter, the switch 37 is actuated once. Although the description is made in this embodiment as that the teaching mode is conducted for the stationary object 36, it can be conducted in the same manner also to an object rotating around the axis $\phi$ as a center.

By the actuation of the switch 37, each of the angular signals outputted from the potentiometers 14-18 at the position $P_O$ is stored in the memory unit 30. Specifically, the control circuit 27, upon receiving the actuation signal from the switch 37, at first outputs a control signal to the selection circuit 26 to control it so that the selection circuit 26 supplies the angular signals from the potentiometers 14-18 successively to the A/D converter 28, outputs a control signal to the circuit 29 for control of signal transfer to control it so that the control circuit 29 transfers the angular signals as the digital signals from the A/D converter 28 to the memory unit 30 and further sends an address signal to the memory unit 30 so that it stores therein the angular signals sent from the signal transfer control circuit 29 successively in the specified memory addresses, for example, the angular signal from the potentiometer 14 at the first address, the angular signal from the potentiometer 15 at the second address, . . . , the angular signal from the potentiometer 18 at the fifth address respectively. In the case where the switch 58 is not actuated in the teaching operation at the position $P_O$, the control circuit 27 writes the spray stop signal at the six$_{th}$ address in the memory unit 30. Further, the control circuit 27 stores the speed signal set in the speed setter 35 at the seventh address in the memory unit 30. The speed setter 35 is constituted with a digital switch having decimal indication and capable of optionally setting the value N as the speed signal, for example, from 2 to 99, and the set value is converted into a binary number and stored as the speed signal in the memory unit 30 under the control of the control circuit 27. Since the counter 38 counts the number of actuations for the switch 37 after the operation to the switch 44 as explained before, it indicates "1" on the displays 39 and 41 as the counted value of the counter 38 after the teaching operation for the position $P_O$.

Then, when the handle 19 is manipulated to move the nozzle 57 to the second teaching position $P_1$ and the switch 37 is actuated again, the angular signals from the potentiometer 14-18 at the position Pare successively stored in the memory unit 30 and, at the same time, the speed signal set by the speed setter 35 is stored in the memory unit 30 as explained before. In the case where the paint spray for the object 36 is started from the nozzle 57 at the position $P_1$, the switch 58 is actuated whereby the spray start signal is stored in the memory unit 30. In the same manner as before, the counted value in the counter 38 is advanced by one after the teaching operation for the position $P_1$ and the value indicated on the displays 39 and 41 is increased to "2". The succeeding procedures are conducted in the same manner, in which the nozzle 57 is moved to the positions $P_2$, . . . , $P_i$, $P_{(i+1)}$, ... $P_n$ and, by the actuation of the switch 37 and the switch 58, the angular signals obtained from the potentiometers 14-18 at each of the positions, the speed signals set by the speed setter 35 and the spray start or stop signal are stored in the memory unit 30. After the completion of the teaching operation for the final position Pn, when the stop switch 45 is actuated, the control circuit 27 writes an operation end signal into the address next to the address to which the final signals have been stored and writes the number (n+1) for the teaching position at the 0 address in the memory unit 30.

In the case where the playback operation is to be executed after the teaching operation, the switch 42 is at first actuated to the ON state. The control circuit 27, upon receiving the ON signal from the switch 42, outputs a control signal actuating the pump in the hydraulic source 47. When the pump of the hydraulic source 47 is actuated, hydraulic pressure is generated from the hydraulic source 47 and supplied to each of the servo valves 56a-56e. Then, when the switch 43 is actuated to set the control circuit 27 to the playback mode and, thereafter, the start switch 44 is actuated, the control circuit 27 starts the control for the playback operation. At first, upon receiving the actuation signal from the switch 44, the control circuit 27 sends a reset signal to the counter 38 to clear the contents of the counter 38. Simultaneously, it also sends a control signal for specifying the read out of the angular signals, the speed signals, and the spray start or stop signal stored at the teaching position $P_O$ to the memory unit 30, and also supplies control signals to the circuit 29 for control of signal transfer and to each of the registers 32a-32e, 33 and 59, so that each of the read out signals is stored in the corresponding registers.

At the same time, the control circuit 27 outputs control signals to the registers 32a-32e and 31a-31e, so that the angular signals which have been stored in the registers 32a-32e are stored in the resisters 31a-31e. The values for the angular signals previously stored in the register 32a-32e are zero in the binary number in the case where the control circuit 27 clears the contents of the registers 31a-31e, 32a-32e and the like at the instance it receives the start signal from the switch 44. It is, however, assumed here for the simplicity of the description that the values Xan - Xen for the angular signals obtained at the teaching position PN have previously been stored in the registers 32a-32e. Accordingly, the values Xan-Xen for the angular signals are stored in the registers 31a -31e, the values Xao - Xeo for the angular signals obtained at the position $P_O$ are stored in the registers 32a-32e, the value Nn for the speed signal is stored in the regiser 33 and the spray stop signal is stored in the register 59 respectively.

When the above values are stored in each of the registers, the control circuit 27 supplies a pulse generation start signal to the pulse generator 48. Thus, the pulse generator 48 generates one shot of pulse. The generated pulse is supplied to the digital interpolation circuits 50a-50e and the counter 49 to change the counted value to 1 in the counter 49. The digital interpolation circuits 50a-50e perform interpolating operation in synchronism with the pulse from the pulse generator 48. Since the counted value "1" is supplied as the counted value $C_n$ from the counter 49 to the digital interpolation circuits 50a-50e, the operation circuits, for example, the circuit 50a executes the operation:

$$X_{an} + \frac{X_{ao} - X_{an}}{N_n} \times 1$$

and other digital interpolation circuits 50b -50e execute the operations in the same manner.

The results of the operations are outputted to the D/A converters 52a-52e respectively. The D/A converters 52a-52e convert the values of the operation results into analog signals and output them to the analog memories 53a-53e respectively. The analog signals supplied to each of the analog memories 53a-53e are supplied as the aimed values to the comparators 54a-54e. Each of the comparators 54a-54e compares the angular signals from the analog memories 53a-53e with the angular signals, as the present value, from the input circuits 21-25 and outputs the difference signal to the servo amplifiers 55a-55e. The difference signals supplied from the servo amplifiers 55a-55e control the servo valves 56a-56e respectively, to charge and discharge the hydraulic pressure of the hydraulic source 47 to each of the actuators 9-13, in such a way that the nozzle 57 is set at a calculated position, that is, at the position $P_{n0i}$ deviated, on the linear line connecting the positions $P_O$ with $P_n$, from the position $P_n$ to the position $P_O$ about by $1/N_n$ of the segment $\overline{P_OP_n}$ (at the position about ½ of the segment $\overline{P_OP_n}$ where $N_n=2$).

Then, after the elapse of a time T, set by the speed setter 46, from the generation of the first pulse in the pulse generator 48, one shot of pulse is again generated from the pulse generator 48 to change the counted value $C_n$ to 2 in the counter 49. Consequently, the operation circuit, for example, the circuit 50a performs the operation:

$$X_{an} + \frac{X_{ao} - X_{an}}{N_n} \times 2$$

in synchronism with the second shot of pulse from the pulse generator 48, and other digital interpolation circuits 50b-50e perform operations in the same manner. In the case where the value $N_n$ for the speed signal set by the speed setter 35 is, for example, 2 in the teaching operation at the position $P_O$, since the register 33 stores a binary value corresponding to 2, the digital interpolation circuits 50a-50e output the values $X_{ao}$-$X_{eo}$ for the angular signals as the results of the operation respectively, and the comparison circuit 51 that compares the contents of the register 33 with the counted value in the counter 49 detects the coincidence and outputs a coincidence detection signal to the control circuit 27. The values $X_{ao}$-$X_{eo}$ for the angular signals from the digital interpolation circuits 50a-50e are converted into analog signals, stored in the analog memories 53a-53e and supplied to each of the servo circuits as the aimed values, by which the nozzle 57 is set at the position $P_O$. As stated above, the value N for the speed signal set by the setter 35 and stored in the memory unit 30 upon teaching operation also specifies the number of divisions in the interpolating operation. That is, if the number of divisions is increased, i.e., the value N for the speed signal is set greater, the moving time of the nozzle 57 from the position $P_i$ to the position $P_{(i+1)}$ is substantially increased and, while on the other hand, if the number of divisions is decreased, i.e., the value N for the speed signal is set smaller, the moving time of the nozzle 57 from the position $P_i$ to the position $P_{(i+1)}$ is substantially decreased. Accordingly, required moving time between the positions, that is, number of divisions can optionally be set by the speed setter 35. Further, the period T for the pulse from the pulse generator 48 set by the speed setter 46 specifies the interval for the generation of the operation result signals issued from the digital interpolation circuits 50a-50e. If the period T is shortened, the interval for the generation of the operation result signals is decreased and the moving time for the nozzle 57 from the position $P_i$ to the position $P_{(i+1)}$ is substantially decreased in the same manner as above. While on the other hand, if the period T is made longer, the interval for the generation and the operation result signals is increased to substantially increase the moving time for the nozzle 57 from the position $P_i$ to the position $P_{(i+1)}$. Accordingly, the required moving time between the positions can optionally be set also by the setter 46.

Then, the control circuit 27, upon receiving the coincidence signal from the comparison circuit 51, outputs one shot of pulse to the counter 38 in order to advance the counted value by one in the counter 38 and also ututs a reset pulse to the counter 49 to reset the counted value in the counter 49 to zero. Thus, the displays 39 and 41 display the "1". Further, the control circuit 27 checks whether the spray start signal is stored or not in the register 59 and, if the spray start signal is stored in the register 59, outputs an actuation start signal to the paint spray actuator 60. Since the spray start has not yet been designated at the teaching position $P_0$ and hence the spray start signal is not stored at this time in the register 59, the paint is not sprayed from the nozzle 57. Thereafter, the control circuit 27 sends a control signal to the memory unit 30 so as to read out the angular signals, the speed signal and the spray start or stop signal stored at the teaching position $P_1$ and, at the same time, supplies control signals to the signal transfer control circuit 29 and to each of the registers 32a-32e, 33 and 59 so as to store each of the read out signals in each of the registers. Further, the control circuit 27 also supplies control signals to the registers 31a-31e and 32a-32e so as to transfer the angular signals stored in each of the registers 32a-32e to the registers 31a-31e. Thus, angular signals at the teaching position $P_0$ are stored in the registers 31a-31e and the angular signals at the teaching position $P_1$ are stored in the registers 32a-32e respectively.

When the signals are stored in each of the registers, the control circuit 27 outputs a pulse generation start signal to the pulse generator 48 in the same manner as before. The pulse generation start signal is generated after the elapse of the time T from the setting to the teaching position $P_0$, and the time T can also be set variably by the speed setter 46 as in the pulse period T from the pulse generator 48. The pulse generator 48, upon receiving the pulse generation start signal, generates one shot of pulse and supplies it to the digital interpolation circuits 50a-50e and to the counter 49. Upon receiption of the one shot of pulse, the digital interpolation circuits 50a-50e perform operations in the same manner as above and output the results of the operation to the D/A converters 52a-52e resectively.

That is, they perform operation:

$$X_{a0} + \frac{X_{a1} - X_{a0}}{N_0} \times C_n$$

based on the counted value $C_n$ in the counter 49. In the case where the value $N_0$ for the speed signal is set to 20 at the teaching position $P_1$, the digital interpolation circuits 50a-50e output positional signals corresponding to every change of the counted value in the counter 49 so that the nozzle 57 is positioned, on a linear line connecting the positions $P_0$ and $P_1$, from the position $P_0$ to the position $P_1$ each by about 1/20 of the segment $\overline{P_0 P_n}$.

The angular signals from each of the digital interpolation circuits 50a-50e are supplied by way of the D/A converters 52a-52e and the memories 53a-53e to each of the servo circuits respectively. Each of the servo circuits moves the nozzle 57 while referring the angular signals from the memories 53a-53e as the command values and based on the angular signals from the inputs circuits 21-25 as the present values. When the counted value in the counter 49 reaches 20, the comparison circuit 51 outputs a coincidence signal to the control circuit 27. The control circuit 27 supplies one shot of pulse to the counter 38 so as to indicate the digit "2" on the displays 39 and 41 and, at the same time, outputs a clear signal to the counter 49 and issues the next control signals in the same manner as above. Since the spray start signal has been stored in the memory unit 30 at the teaching position $P_1$, the spray start signal is contained in the register 59. The control circuit 27 detects the spray start signal and issues an actuation start signal to the actuator 60 after receiving the coincidence signal from the comparison circuit 51. Upon receiving this actuation start signal, the actuator 60 supplies the paint to the nozzle 57 and, consequently, the paint is sprayed from the nozzle 57 and coated to the object 36 at the position $P_1$. The succeeding operation procedures are conducted in the same manner, in which the nozzle 57 is successively positioned at the positions $P_2, \ldots, P_i, P_{i+1}), \ldots$ and simultaneously sprays the paint for applying necessary coating to the object 36.

In the case where the spray stop signal in the register 59 is detected after the positioning to the position $P_n$, the control circuit 27 sends the actuation stop signal to the actuator 60 and the actuator 60 stops the paint supply operation upon receiving this actuation stop signal, whereby the paint spray from the nozzle 57 is stopped. Thereafter, the control circuit 27 starts the reading for the next angular signals and the likes from the memory unit 30. Since the operation end signal has been written into the address succeeding to the address at which the angular signals and the likes relevant to the teaching position $P_n$ have been stored, the control circuit 27 completes the playback control operation upon detecting the reading for the operation end signal and is then put to the stand-by state for detecting the generation of the next start signal. After the detection of the reading for the operation end signal, the control circuit 27 checks the contents stored at 0 address in the memory unit 30, that is, the number (n+1) for the teaching positions and the counted contents in the counter 38 to confirm that the playback operation has been conducted normally.

Description is then made for another embodiment of this invention.

No particular explanations for the manipulator 1 are made in this embodiment since the same manipulator 1 as described referring to FIG. 2 and FIG. 3 is also used in this embodiment.

Figure 8:
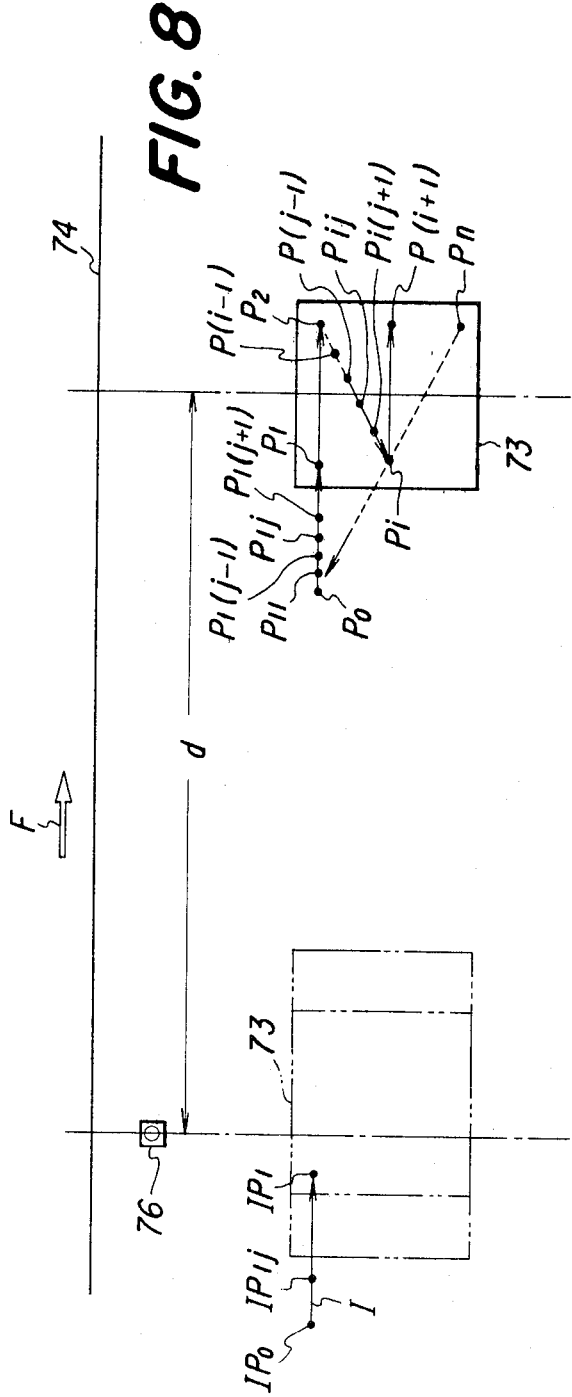
FIG. 8 is an explanatory view of the teaching and playback operations in the embodiment shown in FIG. 6.
Figure 6:
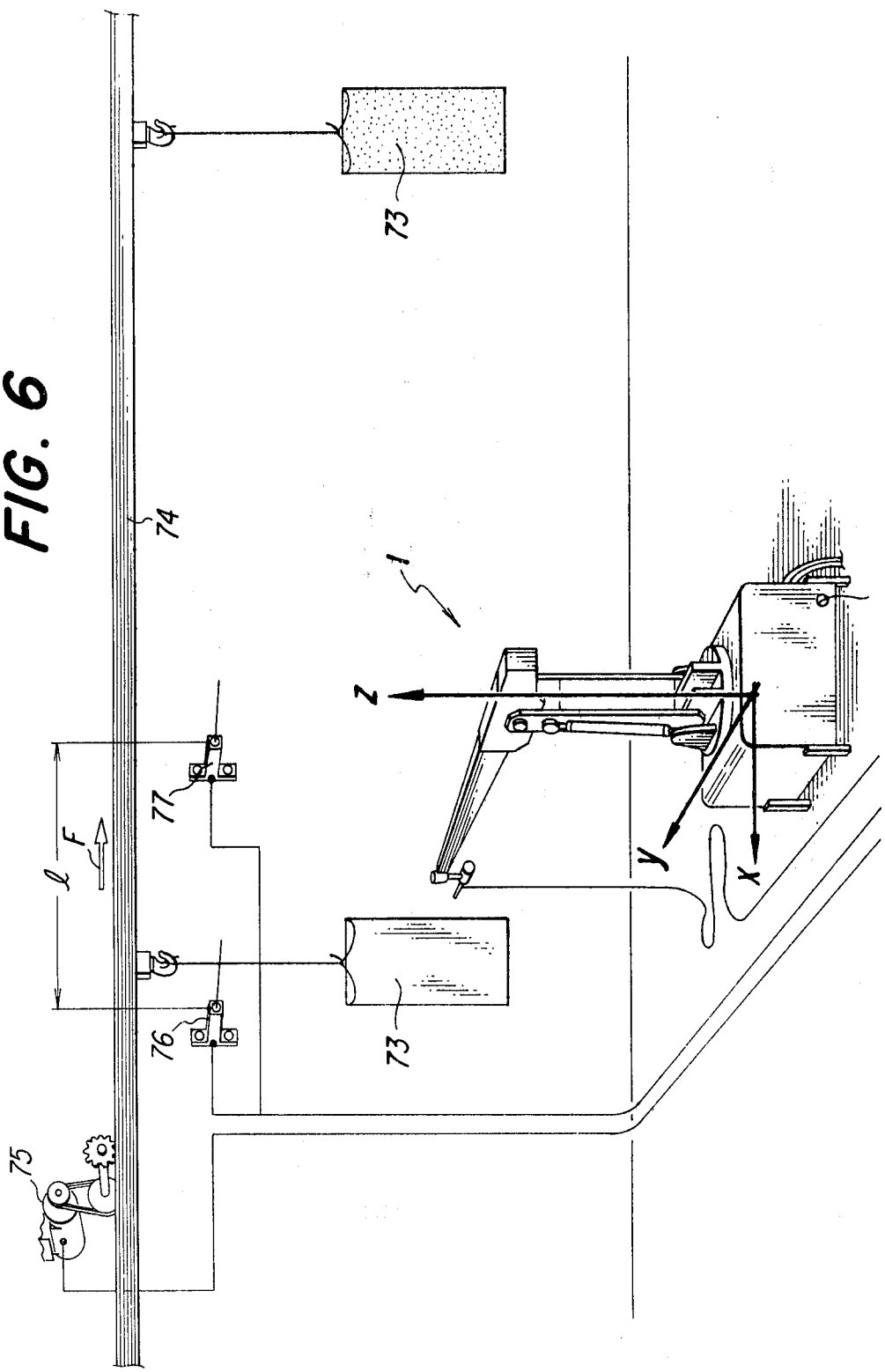
FIG. 6 is an explanatory view of another preferred embodiment of this invention.
Figure 7:
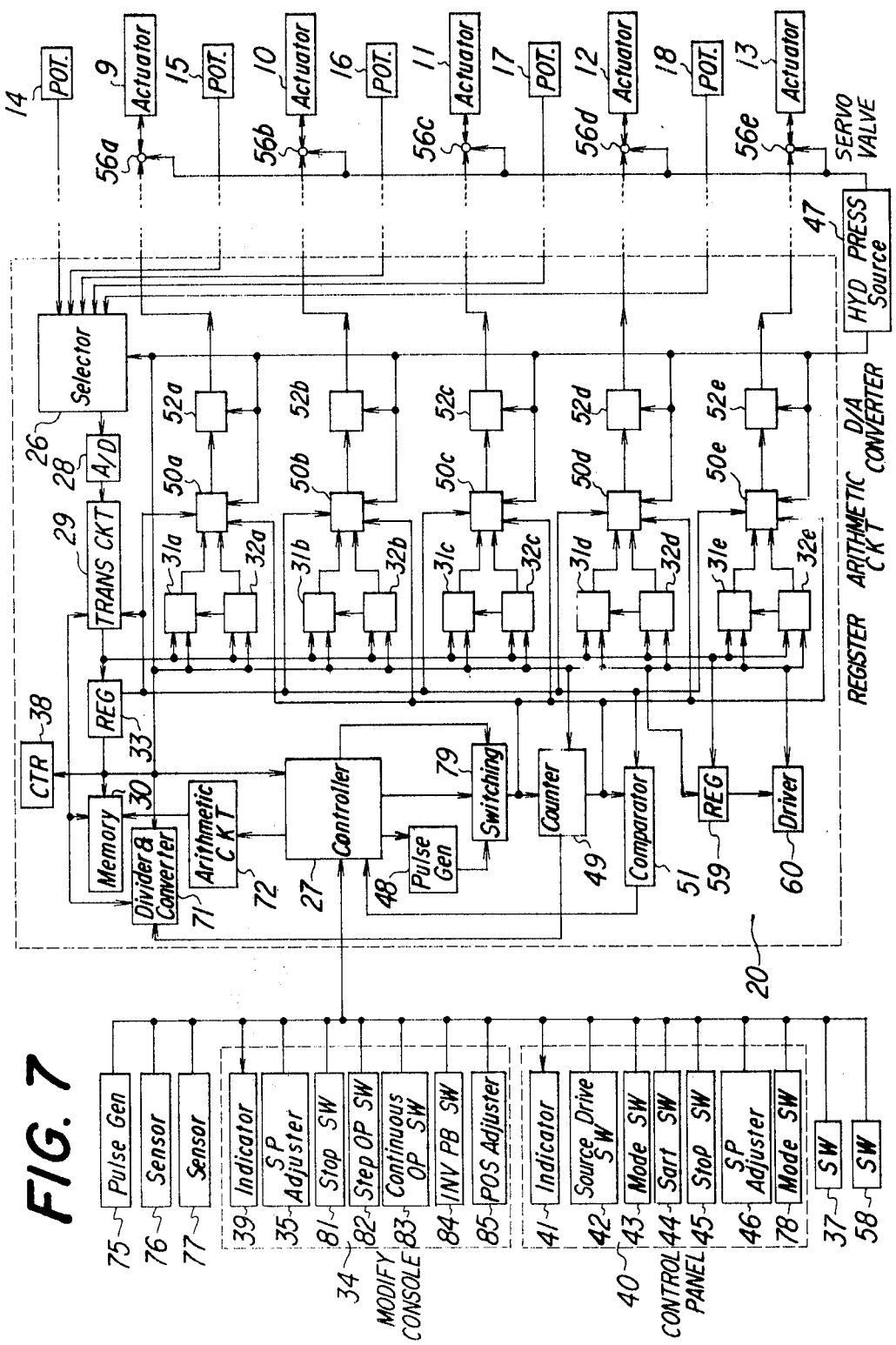
FIG. 7 is a diagram of electronic and hydraulic systems of the embodiment shown in FIG. 6.

In FIG. 6 to FIG. 8, the circuit 29 for control of signal transfer supplies, under the control signal from the control circuit 27, each of the angular signals obtained from the A/D converter 28 at the teaching position $P_i$ and each of the angular signals at the teaching position P$_{(i-1)}$ read out from the memory unit 30 to a division and coordinate conversion circuit or a divider and converter 71, and also supplies each of the angular signals obtained through division and positional conversion in the conversion circuit 71 to the memory unit 30 upon teaching operation. The signal transfer control circuit 29 supplies, also under the control of the control signal from the control circuit 27, the angular signals, the speed signals and the spray start or stop signal read out from the memory unit 30 to the registers 32a–32e, 33 and 59 as described later upon playback operation.

The conversion circuit 71 determines the teaching positions P$_{(i-1)}$ and P$_i$ on an X-Y-Z rectangular coordinate system from the unit distance M and each of the angular signals at the teaching position P$_{(i-1)}$ read out from the memory unit 30, the counted value from the counter 49 and the angular signals at the teaching position P$_i$ supplied from the A/D converter 28, to determine the number of division on the segment P$_{(i-1)}$P$_i$ connecting the position P$_{(i-1)}$ and P$_i$, and calculates the angular signals corresponding to the position P$_{ij}$ for each of the divisional points based on the number of division (hereinafter referred to particularly not coordinate-converted angular signal). It also moves, as described later, the position P$_{(i-1)}$, P$_i$ and the position P$_{ij}$ for each of the divisional points by a certain amount on the X-Y-Z rectangular coordinate system and calculates the angular signals corresponding to the moved position IP$_{ij}$ (hereinafter particularly referred to as coordinate-converted angular signal). The memory unit 30 stores the unit distance calculated in the operation circuit or the arithmetic circuit 72, upon initial setting, at a predetermined memory address and stores, under the control of an address signal from the control circuit 27, not coordinate-converted angular signals and coordinate-converted angular signal from the conversion circuit supplied by way of the circuit 29 for control of signal transfer, the speed signals calculated from the value set by the speed setter 35 provided in the corrector 34 and the paint spray start or stop signal from the switch 58 provided to the handle 19.

Based on the pulses from a pulse generator 75 which generates pulses in response to the movement of a conveyor 74 as means for conveying a suspended object 73 to be painted and the object passage signals from detectors or sensors 76 and 77 which detect the passage of the object 73 in a painting region, the operation circuit 72 calculates the running length of the conveyor relative to one pulse interval (m/pulse) as the unit distance M in the pulses from the pulse generator 75. The distance 1 between the detectors 76 and 77 is previously set to a predetermined value. The operation circuit 72 calculates the running length of the conveyor 74 relative to the one pulse interval as the unit distance by dividing the distance 1 with the number of the pulses from the pulse generator 75 obtained between the object passage signals from the detector 76 and the detector 77. The unit distance M is stored in the memory unit 30 as described before.

The panel 40 further has, provided thereon, a stationary/moving playback mode switch 78. The switch 78 is set to ON where the playback operation is performed for the stationary object 73 to be painted (stationary playback) and set to OFF where the playback operation is performed to the object 73 being conveyed by the conveyor 74 (moving playback). ON or OFF signal from the switch 78 is supplied to the control circuit 27. The control circuit 27 designates the memory unit 30, upon playback operation, either to read out the not coordinate converted angular signals and the speed signals and the spray start or stop signal succeeding thereto or the coordinate-converted angular signals and the speed signals and the spray start or stop signal succeeding thereto depending on the ON or OFF signal from the switch 78. The control circuit 27 also designates the switching circuit 79 either to supply pulses from the pulse generator 75 or pulses from the pulse generator 48 to the counter 49 depending on the ON or OFF signal from the switch 78. The pulses outputted from the switching circuit 79 are supplied to the counter 49 and also to interpolating operation circuits 58a–58e. The counter 49 counts the pulses supplied from the switching circuit 79.

Each of the digital interpolation circuits 50a–50e functions to perform linear interpolation between the j$_{th}$ position P$_{ij}$ and the (j+1)$_{th}$ position P$_{i(j+1)}$ and determine the value, based on each of the values X$_{aij}$–X$_{eij}$ for the angular signals at the position P$_{ij}$ obtained by the division at the i$_{th}$ teaching position P$_i$ from each of the registers 31a–31e, each of the values X$_{ai(j+1)}$–X$_{ei(j+1)}$ for the angular signals at the (j+1)$_{th}$ position P$_{i(j+1)}$ obtained by the division at the i$_{th}$ teaching position P$_i$ from each of the registers 32a–32e, the value N$_i$ for the speed signal calculated on the basis of on the value set at the i$_{th}$ teaching position P$_i$ from the register 33, and the counted value C$_N$ from the counter circuit 49. For example, the operation circuit 50a performs the operation:

$$X_{ar} = X_{aij} + \frac{[X_{ai(j+1)} - X_{aij}]}{N_i} \cdot C_N$$

in order to determine the value X$_{ar}$ of the interpolation position with regard to the range of the angle A between the positions P$_{ij}$ and P$_{i(j+1)}$ obtained by the division on every generation of pulses from the switching circuit 79 upon teaching, based on the value X$_{aij}$ for the angular signal from the register 31, the value X$_{ai(j+1)}$ for the angular signal from the register 32a, the value N$_i$ for the speed signal from the register 33 and the counted value C$_N$ from the counter circuit 49. Other digital interpolation circuits 50b–50e perform the operations in the same manner. The operation of the robot having such constitutions is to be explained. After setting the operation mode to the teaching mode in the same manner as in the previous embodiment, the conveyor 74 is actuated and the object 73 suspended below the conveyor 74 is moved successively in the direction of an arrow F and passed through the painting region defined with a distance 1 so as to obtain the unit distance M.

In this operation, the object passage signals are obtained from the detectors 76 and 77 and, while on the other hand, pulses indicating the running length of the conveyor 74, that is, the moving amount of the object 73 are obtained from the pulse generator 75. The operation circuit 72 calculates the unit distance M=(number of pulse 1 obtained between the generation of the object passage signal from the detector 76 and the generation of the object passage signal from the detector 77/distance 1), based on the object passage signals and the number of the pulses from the pulse generator 75. After the above calculation, the operation circuit 72 sends out the unit distance M to the memory unit 30 and the memory unit 30 stores this unit distance M at a predetermined address. The initial setting operation for determining the unit distance M may be required only for once upon installation of the robot provided that the memory units 30 are non-volatile.

After the completion of the initial setting, the start switch 44 is actuated to set the control circuit 27 to the start state. Then, the conveyor 74 is actuated again to move the object 73 from the left of the detector 76 in the direction of the arrow F so that it is located at a position in the painting region where the teaching operation is most facilitated and, thereafter, the actuation for the conveyor 74 is stopped. In the setting of the position for the object 73 within the painting region, the object passage signal is obtained from the detector 76 and a series of pulses are obtained from the pulse generator 75. The control circuit 27 supplies the pulses from the pulse generator 75 to the switching circuit 78 after the generation of the object passage signal from the detector 76. In the case where the teaching mode is set, since the switching circuit 79 is set by the control circuit 27 so as to output the pulses from the pulse generator 75, the pulses from the pulse generator 75 are supplied to the counter 49. The counter 49 counts the number of the pulses from the pulse generator 75 corresponding to the distance d between the detector 76 and the position at which the object 73 has been set. Then, the handle 19 is manipulated to the object 73 to move the nozzle 57 to the initial teaching position $P_0$ and, thereafter, the switch 37 is actuated once.

By the actuation of the switch 37, the angular signal obtained from the potentiometers 14–18 and the value set by the speed setter 35 at the teaching position $P_0$ are respectively supplied to the conversion circuit 71. Specifically, the control circuit 27, upon receiving the actuation signal from the switch 37, at first outputs a control signal to the selection circuit 26 causing it to supply the angular signals from the potentiometers 14–18 successively to the A/D converter 28 and supplies a control signal to the signal transfer control circuit 29 causing it to transfer the angular signals, in the form of digital signals, from the A/D converter 28 to the conversion circuit 71. The control circuit 27 also supplies the value set by the speed setter 35 to the conversion circuit 71. On receiving the angular signals at the first teaching position $P_0$, the conversion circuit 71 at first sends out the supplied angular signals as they are to the signal transfer control circuit 29 as the not coordinate-converted angular signal. At the same time, the conversion circuit 71 determines the position $IP_0$ displaced from the teaching position $P_0$ leftwardly by the distance d in the X-Y-Z rectangular coordinate system based on the supplied angular signals, the unit distance M previously stored in the memory unit 30 and the counted value counted in the counter 49, calculates the angular signals obtained from each of the potentiometers at the position of the nozzle 57 set the position $IP_0$, and sends out them as the coordinate-converted angular signals to the signal transfer control circuit 29.

When the coordinate-converted angular signals are thus obtained the control circuit 27 at first sends out an address signal to the memory unit 30 causing it to store the not coordinate-converted angular signals sent from the circuit 29 for control of signal transfer at the memory addresses of the specified memory region (hereinafter referred to as the first memory region), for example, the angular signals from the potentiometer 14 at the first address, the angular signals from the potentiometer 15 at the second address, ... and the angular signals from the potentiometer 18 at the fifth address of the first memory region respectively. While on the other hand, the control circuit 27 also controls the memory unit 30 to store the coordinate-converted angular signals sent out from the circuit 29 for control of signal transfer at the memory addresses of other specified memory regions (hereinafter referred to as the second memory region) in the same manner as above.

In the case where the switch 58 is not actuated in the teaching operation at the position $P_0$, the control circuit 27 controls the memory unit 30 to store the spray stop signal at each of the sixth addresses of the first and the second memory regions respectively. The control circuit 27 further controls the memory unit 30 to store the speed signals calculated based on the value set by the speed setter 35 at each of the seventh address of the first and the second memory regions. The value set by the speed setter 35 is supplied under the control of the control circuit 27 to the conversion circuit 71. The conversion circuit 71 calculates the speed based on the value for the supplied speed set signal as described later and the calculated value is stored as the speed signal in each of the memory regions of the memory unit 30. The values set by the speed setter 35 specifies the rate of the speed in the playback operation to the moving speed for the conveyor 74.

Then, the handle 19 is manipulated to move the nozzle 57 to the second teaching position $P_1$ and, when the switch 37 is actuated again, the angular signals from the potentiometer 14–18 at the teaching position $P_1$ are successively supplied to the conversion circuit 71 in the same manner as above. At the same time, the angular signals at the teaching position $P_0$ stored in the first memory region of the memory unit 30, the unit distance M also stored in the memory unit 30, the counted value from the counter 49 and the speed set signal set by the speed setter 35 are supplied to the conversion circuit 71. The conversion circuit 71 at first determines the positions $P_0$ and $P_1$ in the X-Y-Z rectangular coordinate system based on the unit distance M, the counted value from the counter 49 and the angular signals from the teaching positions $P_0$ and $P_1$, calculates the distance from the position $P_0$ to the position $P_1$ and then determines the least integer m relative to the number of pulses $n_p$ from the pulse generator 75 required for the movement from the position $P_0$ to the position $P_1$ satisfying the following equation, by dividing the calculated distance with the speed set signal and the unit distance M:

$$N_0 = \frac{n_p}{m} \leq$$

predetermined number of pulse, wherein the predetermined number of pulse is set so that the trace of the nozzle 57 draws an arc that can be regarded as a linear line in the playback operation, and $N_0$ is the speed signal calculated based on the speed set signal.

In the case where the integer m is at least 2, the conversion circuit 71 operates to equally divide by m the linear segment $\overline{P_0P_1}$ connecting the positions $P_0$ and $P_1$ in the X-Y-Z rectangular coordinate system, calculates the angular signals corresponding to the angular signals obtained from the potentiometers 14–18 at each of the divided positions $P_{ij}$ and sends out them to the circuit 29 for control of signal transfer as the not coordinate-converted angular signals. The conversion circuit 71 also outputs the speed signal $N_0$.

The speed signal $N_n$ at the teaching position $P_0$ is calculated by previously setting an imarginal position and the conducting the calculation based on the imarginal position and the position $P_0$ as stated before.

The conversion circuit 71 further calculates the position $IP_{ij}$ for the nozzle 57 from the position $IP_0$ along with the movement of the object 73 according to the followng equation:

$$IP_{ij} = \begin{bmatrix} \text{position for the} \\ \text{teaching position} \\ P_0 \end{bmatrix} + \begin{bmatrix} \text{unit distance M} \cdot \text{(counted} \\ \text{value in the counter} \\ 49 + n_0 \times j/m) \end{bmatrix}$$

wherein $j = 1, 2, \ldots, m$.

The conversion circuit 71 calculates the angular corresponding to the angular signals obtained from the potentiometers 14–18 at each of the positions $IP_j$ in the X-Y-Z rectangular coordinate system and sends out them as the coordinate-converted angular signals to the circuit 29 for control of signal transfer. In the same manner as above, each of the not coordinate-converted angular signals is stored at the address in the first memory region of the memory unit 30 succeeding to the address where the spray stop signal stored at the teaching position $P_0$ has been stored and, while on the other hand, each of the coordinate-converted angular signals is stored at the address in the second memory region of the memory unit 30 succeeding to the address where the spray stop signal stored at the teaching position $P_0$ (at the equivalent teaching position $IP_0$ in view of the coordinate conversion) has been stored. Then, subsequent to the store for each of the angular signals, the speed signal $N_0$ is stored at the succeeding addresses in the first and second memory regions of the memory unit 30.

In the case where the paint spray by the nozzle 57 is started at the teaching position $P_1$ for the object 73, the switch 58 is actuated, by which the spray start signal is stored succeeding to the store of the speed signal in the first and second memory regions of the memory unit 30 after the angular signals and the speed signal have been stored, in the final divided position $P_1$, $IP_1$ (corresponding to $m = j$). Succeeding operations are conducted in the same manner by moving the nozzle 57 to the position $P_2, \ldots P_i, P_{(i+1)}, \ldots P_n$ successively, in which the divided not coordinate-converted angular signals and divided coordinate-converted angular signals based on the angular signals obtained from the potentiometers 14–18 at each of the positions, the speed signals based on the speed set signal set by the speed signal 35 and the spray start or stop signal are stored in the first and second memory regions of the memory unit 30.

In the positioning of the nozzle 57 by the coordinate-converted angular signals upon playback operation, it will be apparent that the coordinate-converted angular signals have been obtained by the calculating operation so that the angle of the nozzle 57 relative to the object 73 is the angle set in the teaching operation. In the case of the stationary playback operation where the playback operation is conducted while staying still the object 73 at the position in the teaching operation without conveying it by the conveyor 74 after the completion of the teaching operation, the switch 78 is at first actuated to designate the stationary playback mode to the control circuit 27. Then, when the switch 42 is actuated to drive the pump of the hydraulic source 47, hydraulic pressure is generated from the hydraulic source 47 and supplied to each of the valves 56a–56e. Then, when the switch 43 and the switch 44 are actuated, the control circuit 27, receiving the actuation signal from the switch 44, sends out a reset signal to the counter 38 and, at the same time, sends out a switching signal to the switching circuit 79 causing it to output the pulses from the pulse generator 48. Further, the control circuit 27 sends out the memory unit 30 a control signal that specifies the reading for the angular signals, the speed signals and the spray start or stop signal at the teaching position $P_0$ stored in the first memory region and also sends out control signals to the circuit 29 for control of signal transfer and to each of the registers 32a–32e, 33 and 59 so that each of the read out signals is stored in the corresponding registers. The control circuit 27 also outputs control signals to the registers 31a–31e and 32a–32e in order to store the angular signals, for example, the values $X_{an}-X_{en}$ for the angular signals obtained at the teaching position $P_n$ previously in the registers 32a–32e to the registers 31a–31e. Consequently, value $X_{an}-X_{en}$ for the angular signals are stored in the registers 31a–31e, the values $X_{a0}-X_{e0}$ for the angular signals obtained at the position $P_0$ are stored in the registers 32a–32e, the value $N_n$ for the speed signal (the speed signal stored at the teaching position $P_0$ is the value in the case of moving from the position $P_n$ to the $P_m$) is stored in the register 33 and the spray stop signal is stored in the register 59 respectively. When the above values are stored in each of the registers, the control circuit 27 supplies a pulse generation start signal to the pulse generator circuit 48, by which the pulse generator 48 generates one shot of pulse. The pulse thus generated is supplied by way of the switching circuit 79 to the digital interpolation circuits 50a–50e and the counter 49 to change the counted value to 1 in the counter 49.

The digital interpolation circuits 50a–50e performs interpolating operations in synchronism with the pulses from the switching circuit 79. Since the value "1" is supplied as the counted value $C_n$ from the counter 49 to the digital interpolation circuits 50a–50e, the digital interpolation circuit 50a, for example, performs the operation:

$$X_{an} + \frac{X_{a0} - X_{an}}{N_n} \times 1$$

and other digital interpolation circuits 50b–50e perform the operations in the same manner. The results of the operation are outputted to the A/D converters 52a–52e respectively.

Succeeding operations are the same as in the previous first embodiment, in which the hydraulic pressure from the hydraulic source 47 is charged and discharged to each of the actuators 9–13, so that the nozzle 57 is set at the calculated position, that is, at the position $P_{n01}$ deviated from the position $P_n$ to the position $P_0$ by about $1/N_n$ of the segment $\overline{P_0 P_n}$ on the linear line connecting position $P_0$ and $P_n$ (at about $\frac{1}{2}$ position of the segment $\overline{P_0 P_n}$ for the case where $N_n = 2$). Then, after the elapse of a time T set by the setter 46 from the generation of the first pulse, one shot of pulse is again generated from the pulse generator 48 to advance the counter value $C_n$ to 2 in the counter 49. Thus, for example, the digital interpolation circuit 50a performs the operation:

$$X_{an} + \frac{X_{ao} - X_{an}}{N_n} \times 2$$

in synchronism with the second shot of the pulse from the pulse generator 48, and other digital interpolation circuits 50b–50e perform the operations in the same manner. In the case where the value $N_n$ for the speed signal prepared by converting the speed set signal set by the speed setter 35 into the number of pulse in the teaching operation at the position $P_0$ is, for example, 2, since a binary value corresponding to 2 is stored in the register 33, the operation circuits 50a–50e output the values $X_{a0}$–$X_{e0}$ for the angular signals respectively as the results of the operations and, while on the other hand, the comparison circuit 51 that compares the content of the register 33 with the counted value in the counter 49 detects the coincidence and outputs a coincidence signal to the control circuit 27. The values $X_{a0}$–$X_{e0}$ for the angular signals from the digital interpolation circuits 50a–50e are converted into analog signals and supplied as the aimed values to each of the servo circuits, by which the nozzle 57 is set at the position $P_0$. Thus, the value for the speed signal set by the speed setter 35 in the stationary teaching operation also specifies the number of divisions for the interpolating operation. If the number of divisions is decreased, that is, the value for the speed signal is made larger, the moving time of the nozzle 57 from the position $P_{ij}$ to the position $P_{i(j+1)}$ is substantially shortened and, while on the other hand, if the number of divisions is increased, that is, the value for the speed signal is made smaller, the moving time of the nozzle 57 from the position $P_{ij}$ to the position $P_{i(j+1)}$ is substantialy increased. Accordingly, required moving time and the number of division between the positions, that is, the painting speed can optionally be set by the speed setter 35. The period T for the pulses from the pulse generator 48 also specifies the moving time of the nozzle 57 in the same manner as in the first embodiment.

Then, on receiving the coincidence signal from the comparison circuit 51, the control circuit 27 steps up the counter 38 and resets the counter 49 and also checks whether the spray start signal from the memory 38 is stored or not in the register 59. Since the spray start is not designated at the teaching position $P_0$ and hence the spray signal is not yet stored then in the register 59, paint is not sprayed from the nozzle 57. Thereafter, the control circuit 27 reads out the angular signals, speed signals, and spray start or stop signal stored in the first memory region at the teaching position $P_1$ and transfers the positional signals stored in each of the registers 32a–32e to each of the registers 31a–31e. Thus, the angular signals at the teaching position $P_0$ are stored in the registers 31a31e and th angular signals relative to the first divided position $P_{11}$ at the teaching position $P_1$ are stored in the registers 32a–32e respectively. After the above signals have been stored in each of the registers, the control circuit 27 issues the pulse generation start signal to the pulse generator 48 after the elapse of the time T from the setting of the nozzle 57 to the position $P_0$ in the same manner as above. Upon receiving the pulse generation start signal, the pulse generator 48 generates one shot of pulse and supplies it by way of the switching circuit 79 to the digital interpolation circuits 50a–50e and to the counter 49. Upon receiving this one shot of pulse, the digital interpolation circuit 50a–50e perform the operations in the same manner as above and output the results of the operation to the D/A converters 52a–52e respectively. For example, the digital interpolation circuit 50a performs the operation:

$$X_{a0} + \frac{X_{a11} - X_{a0}}{N_0} \cdot C_n$$

based on the counted value $C_n$ in the counter 49. In the case where the value $N_0$ for the speed signal at the teaching position $P_1$ is stored as 20, the digital interpolation circuits 50a–50e output the angular signals in response to every changes for the counted value in the counter 49, so that the nozzle 57 is positioned from the position $P_0$ to the position $P_{11}$ each by about 1/20 of the segment $\overline{P_0P_{11}}$ on the line connecting the positions $P_0$ and $P_{11}$.

The nozzle 57 is moved in this manner toward the position $P_{11}$. Thereafter, same operations are repeated and, when the counted value in the counter 49 reaches 20, the comparison circuit 51 outputs a coincidence signal to the control circuit 27. Then, the control circuit 27 outputs a clear signal to the counter 49 and also issues a control signal to each of the registers 31a–31e and 32a–32e, so that the angular signals corresponding to the succeeding divided position $P_{12}$ at the teaching position $P_1$ are stored in the registers 32a–32e and the angular signals to the position $P_{11}$ stored in the registers 32a32e are stored in the registers 31a–31e.

After the reading of the positional signals relative to the position $P_{12}$, the digital interpolation circuits 50a–50e perform the interpolating operations in the same manner as above. For example, the digital interpolation circuit 50a performs the operation:

$$X_{an} + \frac{X_{12} - X_{a11}}{N_0} \cdot C_n$$

In the $m_{th}$ reading for the angular signals corresponding to the number of division m, the angular signals relative to the teaching position $P_1$ are read out, for which the digital interpolation circuits 50a–50e perform the same interpolating operations and supply the results of the operations as the aimed values to the servo circuits to set the nozzle 57 at the position $P_1$.

Since the spray start signal has been stored in the memory unit 30 in the teaching position $P_1$, the spray start signal is contained in the register 59. The control circuit 27 detects the spray start signal after receiving the coincidence signal from the comparison circuit 51 and then outputs the actuation start signal to the actuator 60, by which paint is sprayed from the nozzle 57 and applied to the object 73 at the position $P_1$. The succeeding operations are conducted in the same manner, in which the nozzle 57 is successively positioned at the positions $P_2, \ldots P_i, P_{(i+1)}, \ldots P_n$ and, simultaneously, sprays the paint for applying required coating to the object 73. The end operation for the stationary playback is conducted in the same manner as that in the first embodiment.

In the case of the moving playback operation where the playback operation is performed while moving the object 73 conveying it by the conveyor 74, the switch 78 is actuated to designate the moving playback mode to the control circuit 27. Then, when the moving playback start state is set by the actuation to the switch 44, the control circuit 27 sends out a switching signal to the switching circuit 79 to issue the pulses of the pulse generator 75 therefrom. When the conveyor 74 is actuated in this state to move the object 73 in the direction of the arrow F passing over the detector 76, the detector 76 sends out an object passage signal to the control circuit 27. Upon receiving the object passage signal, the control circuit 27 starts and continues the same control operation as in the case where the start switch 44 is actuated in the stationary playback operation. In the moving playback operation, the angular signals and the likes read out from the memory unit 30 are coordinate-converted angular signals stored in the second memory region and the pulses supplied to the counter 49 are the pulses from the pulse generator 75. Accordingly, the control circuit 27 conducts its controlling operation substantially synchronized with the pulses from the pulse generator 75 and the nozzle 57 is moved along with the movement of the object 73 based on the coordinate-converted angular signals. That is, the nozzle 57 applies coating to the moving object 73 based on the angular signals stored in the second memory region of the memory unit 30.

Although the foregoing embodiments have been constituted to successively perform the playback operations continuously, this invention is no way limited to such embodiments. In one modified embodiment, for instance, a temporary stop switch 81 is provided to a portable console 34, in which the control operation of the control circuit 27 is interrupted before the reading of new angular signals in the playback operation, and new teaching operations can be made for positions after the position for which the reading has been interrupted. Provision of the stop switch 81 for enabling the playback control to be interrupted at optional positions leads to easy correction for the teaching position. Where a teaching position is to be deleted in the correction of the teaching position, the teaching program can be rearranged by storing the angular signals and the likes at the teaching position next to the teaching position to be deleted in each of the addresses of the memory unit 30 at which the angular positions and the likes for the teaching position to be deleted have been stored, and storing the angular signals and the likes for succeeding teaching positions to each of the addresses of the memory unit 30 carried up successively. While on the other hand, addition of a teaching position in the correction or modification can be attained, for example, by actuating the stop switch 81 at the position one step before the adding position to interrupt the playback control of the control circuit 27 and then perform the teaching operation to the adding position in the teaching mode and storing the angular signals and the likes relative to the teaching positions subsequent to the adding position in each of the addresses carried down successively. The exact point at which the teaching point is read out from the memory unit 30 in the playback operation can be confirmed by the displays 39 and 41 which indicate the counted value in the counter 38.

Provision of the above stop switch 81 makes it possible to correct or modify each of the teaching positions and to increase or decrease the number of teaching positions thereby enabling to provide a robot excellent in versatile application uses. In a further embodiment, angular signals and the likes only for one optional position are stored in the memory unit 30 and the teaching operations for all of other teaching positions are performed as the correcting operation. In a further embodiment, a stepwise operation switch 82 and a continuous operation switch 83 are provided to the corrector 34, and the control circuit 27 is constituted such that the nozzle 57 is moved stepwise at each teaching position or at each divided position on every actuation of the stepwise switch 82 after the actuation to the switch 81 and, while on the other hand, the nozzle 57 is moved continuously during the actuation to the switch 83 in the playback operation. An inverse playback designation switch 84 may be added so that the playback operation can also be performed in an inverse manner as $P_n$, $P_{n-1}$, ... $P_2$, $P_1$ by the actuation to the switch 84. The speed setter 35 may be provided on the panel 40. A still further embodiment has a position setter or adjuster 85 provided to the corrector 34 which can set the required vertical and horizontal moving amounts irrespective of the angular signals stored in the memory unit 30, so that the nozzle 57 may be moved by the amounts set by the position setter 85. The robot according to this invention is not restricted only to the painting use but it is also applicable to various uses, for example, as a robot for welding use having a welding torch in the manipulator.

What is claimed is:

1. A robot, comprising:
   a manipulator having a plurality of movable members, each member connected to its adjacent member with a joint;
   means for detecting the relative positions of adjacent movable members with respect to each other at each of the joints;
   means for generating positional signals from the detecting means upon teaching operations;
   memory means for successively storing positional data produced from said positional signals;
   means for determining the number of interpolative positions between two of said positions based on two stored positional data entries which are read out from said memory means and for interpolating said determined number of positions between said successive two positions; and
   means for positioning each of the movable members of the manipulator referring to resulting values of the determining means and interpolating means as command values and based on the the positional signals from the detecting means as present values.

2. The robot of claim 1, in which the generating means comprises a switch provided to the manipulator, the memory means storing the positional signals from the detecting means designated by the actuation of the switch as the stored positional data.

3. The robot of claim 1, further comprising means capable of optionally setting the number of positions between the two positions calculated by the interpolating operation of the interpolating means.

4. The robot in any one of claims 1 to 3, further comprising means for producing pulses that specify the start of the interpolating calculation to each of the positions between two positions, and for setting the interval of the pulses from the pulse producing means in a variable manner.

5. The robot of claim 1, further comprising means for conveying a workpiece, means for detecting the distance moved of the workpiece conveyed by the conveying means from a reference position, and means for applying coordinate-conversion to the positional signals generated by the generating means with the distance moved obtained from the distance moved detection means, converting the generated positional signals into the positional signals relative to the moving workpiece and supplying the converted positional signals to the memory means as the positional data, the interpolating means executing the interpolating calculation in order to determine the required number of conversion positions between the positions corresponding to two converted positional signals read out from the memory means, based on the two read out converted positional signals and the distance moved of the workpiece from the distance moved detection means.

6. The robot of claim 5, in which the generating means comprises a switch provided to the manipulator, and the coordinate-conversion is applied to the positional signals from the detectors designated by the actuation of the switch.

7. The robot of claim 5, further comprising means capable of optionally setting the number of positions between two positions calculated by the interpolating operation of the interpolating means.

8. The robot of claim 1 or 5, in which the manipulator has a wrist, an arm and a support post as the movable members, the wrist and the support post are movable both in horizontal planes and vertical planes and the arm is movable in a vertical plane.

9. The robot of claim 8, in which the positional detecting means comprises potentiometers detecting the relative positions of the movable members to each other as the angles between each of the adjacent movable members in the horizontal planes and vertical planes.

10. The robot of claim 5, in which the distance moved detection means comprises a generator for producing electrical pulses in response to the distance moved of the workpiece conveyed by the conveying means.

11. The robot of claim 1 or 5, in which the interpolating means executes the linear interpolation.

12. The robot of claim 1 or 5, further comprising means capable of optionally adjusting the time interval in the interpolating operation.

13. The robot of claim 1 or 5, further comprising means capable of optionally setting the number of positions interpolated by the interpolating means.

14. The robot of claim 13, further comprising a portable correction means provided with the setting means.

15. A manipulator apparatus, comprising:
a manipulator having a plurality of swingable members, each member connected swingably to its adjacent member through a pivotable joint, and being provided with a tool on the free end thereof;
means for detecting the relative angular positions between adjacent swingable members;
means for generating angular positional signals issued from said detecting means upon teaching operation;
means for calculating a distance between successive two positions of said tool from successive two groups of said angular positional signals generated by said generating means;
means for comparing said distance calculated by said calculation means with a predetermined distance;
means for determining the number of interpolative positions between said successive two positions by signals from said comparison means, and interpolating said determined number of positions between said successive two positions, on a straight line connecting said successive two positions;
means for producing angular positional signals in relation to said interpolated position;
memory means for successively storing said angular positional signals produced by said producing means; and
means for positioning each of said swingable members in accordance with the angular positional signals read out from said memory means as command signals and angular positional signals issued from said detection means as present positional signals.

16. A manipulator apparatus according to claim 15, said manipulator apparatus further comprising:
means for producing a series of electrical pulses at time intervals independently of positions of a workpiece said tool being positioned at said time intervals upon playback operation.

17. A manipulator apparatus according to claim 15, said manipulator apparatus further comprising:
means for producing a series of electrical pulses in synchronization with movements of a workpiece; said tool being positioned at time intervals of occurrences of said electrical pulses upon playback operation.

18. A manipulator apparatus according to claim 16, said manipulator apparatus further comprising means for manually adjusting said time intervals of occurrences of said electrical pulses.

19. A manipulator apparatus according to any one of claims 15 to 18 said generating means comprising a manual switch mounted on said manipulator the angular positional signals issued from said detecting means being generated by the actuation of said manual switch.

20. A manipulator apparatus according to any one of claims 15 to 18 said manipulator apparatus further comprising:
means for executing a second interpolating operation from successive two angular positional signals read out from said memory means to interpolate a position between the positions corresponding to said successive two angular positional signals upon playback operation; and
means for manually adjusting the number of positions to be interpolated by said second interpolation means, the number of said interpolated positions upon playback operation being determined with values set by said manual adjusting means.

21. A manipulator apparatus according to claim 15, said manipulator apparatus further comprising:
means for conveying a workpiece;
means for detecting the distance moved of said workpiece conveyed by said conveying means from a reference position; and
means for applying coordinate-conversion to said interpolated positions and converting said interpolated positions into the positions relative to said workpiece moved by said conveying means said producing means producing angular positional signals corresponding to said converted position as said angular positional signals in relation to said interpolated positions.

22. A manipulator apparatus according to claim 21, wherein, said detecting means for the distance moved has means for generating a series of electrical pulses in synchronization with movements of a workpiece, said tool being positioned at time intervals of occurrences of said electrical pulses upon playback operation.

23. A manipulator apparatus according to claim 21 or 22 wherein, said generating means comprises a manual switch mounted on said manipulator; the angular positional signals issued from said detecting means for angular positions being generated by the actuation of said manual switch.

24. A manipulator apparatus according to claim 21 or 22 wherein, said manipulator apparatus further comprises means for executing a second interpolating operation from successive two angular positional signals read out from said memory means to interpolate a position between the positions corresponding to said successive two angular positional signals upon playback operation; and means for manually adjusting the number of positions to be interpolated by said second interpolation means, the number of said interpolated positions upon playback operation being determined with values set by said manual adjusting means for the number of positions to be interpolated.

* * * * *